United States Patent [19]

Mintzlaff

[11] Patent Number: 4,893,210
[45] Date of Patent: Jan. 9, 1990

[54] COMPUTER DISK DRIVE ASSEMBLY HAVING A RESILIENTLY SUPPORTED SEPARABLE DISK PACK UNIT

[75] Inventor: Richard P. Mintzlaff, Granada Hills, Calif.

[73] Assignee: Danford Corporation, San Pedro, Calif.

[21] Appl. No.: 217,618

[22] Filed: Jul. 11, 1988

[51] Int. Cl.[4] .................. G11B 17/00; G11B 33/08; G06F 1/00; F16M 1/00
[52] U.S. Cl. .................. 360/137; 248/612; 248/613; 360/97.01; 361/417; 364/708
[58] Field of Search ............ 360/97.01, 97.02, 97.03, 360/97.04, 99.01, 137; 248/566, 570, 610–613, 638; 364/708; 310/91; 361/427, 429, 420, 417

[56] References Cited

U.S. PATENT DOCUMENTS

| | | | |
|---|---|---|---|
| 4,553,183 | 11/1985 | Brown et al. | 360/97.02 |
| 4,683,520 | 7/1987 | Grassens et al. | 248/612 |
| 4,713,714 | 12/1987 | Gatt et al. | 360/137 |
| 4,719,526 | 1/1988 | Okitu et al. | 360/99.06 |
| 4,725,244 | 2/1988 | Chewning et al. | 364/708 |
| 4,812,932 | 3/1989 | Hishinuma et al. | 360/97.01 |

OTHER PUBLICATIONS

"Personal Computer Structure Designed for Robotized Manufact Usability", IBM TDB, Aug. 1987, vol. 30, No. 3, pp. 1253–1255.

Primary Examiner—Stuart N. Hecker
Assistant Examiner—David J. Severin
Attorney, Agent, or Firm—Edward A. Sokolski

[57] ABSTRACT

A computer disk assembly has a power supply-wiring harness unit and a disk pack unit for housing and mounting a hard disk drive. This disk drive is suspended within its housing on a vibration isolating suspension system which utilizes a plurality of spring steel coils, this suspension system being designed to isolate the disk from external vibrations and shock. The power supply-wiring harness unit is removably connected to the disk pack unit through a fastening system which includes an elongated plate member which slides into a channel formed in the bottom of the disk pack unit and a latching fastener member which is driven by a handle and engages a mating receptacle in the disk pack unit. Electrical connections are made between a wiring harness in the power supply-wiring harness unit and the disk pack unit by means of mating electrical connectors on both units wherein electrical connection between the connector contacts is made by side wise movement of the contents of one of the connectors after the two units are mechanically joined together.

2 Claims, 6 Drawing Sheets

COMPUTER DISK DRIVE ASSEMBLY HAVING A RESILIENTLY SUPPORTED SEPARABLE DISK PACK UNIT

BACKGROUND OF THE INVENTION

This invention relates to a computer disk drive assembly and more particularly to such an assembly having a disk pack unit which is readily separable from an associated power supply-wiring harness unit.

In certain situations particularly where high security risks are involved, it is necessary to remove a hard disk drive containing such security information from the associated equipment for security storage after each use of the disk drive. To facilitate handling, it is desirable that only the disk drive itself be removed. Along these lines it is desirable that the disk drive unit be as light as possible. Further, in view of the fragility of hard disk drives, adequate vibration and shock isolation must be provided for the disk drive within the unit in which it is housed so that it is adequately isolated from vibration and shock forces which may be encountered in the handling of the unit. Also, in view of the frequent attachment and detachment of the electrical connections made between the disk drive and its associated equipment, it is important that there be a mechanism for assuring there is minimum wear and tear on the electrical connector and at the same time assuring good electrical connections.

SUMMARY OF THE INVENTION

The system of the present invention provides simple yet highly effective mechanisms for achieving the aforementioned requirements for a removable disk drive. Briefly described, the system of the present invention achieves these desired end results in the following manner:

The disk drive is resiliently suspended within a disk pack unit by means of spring steel wire coils on which the disk drive is suspended from the walls of a housing. The steel coil suspension system is designed so that it effectively damps out vibrations and shocks at frequencies which are likely to be encountered, thereby affording optimum vibration isolation for the disk drive. An elongated plate member which extends from the power supply-wiring harness unit fits within an elongated mating channel formed in the bottom of the disk drive housing. Zero insertion force mating connectors are provided on the disk pack and power-wiring harness units, the connectors operating in conjunction with a locking interconnecting fastener for the two units. This fastener is operated by means of a hand crank which is used to drive the fastener first to mechanically interconnect the two units and then to drive a mechanism which brings the contacts of the connectors into electrical contact with each other and finally actuates a microswitch to provide power to the disk drive unit.

It is therefore an object of this invention to facilitate the removal of a computer disk drive from its associated equipment for storage.

It is a further object of this invention to provide an improved disk drive assembly having a reliable mechanism for detaching a disk drive unit from its associated power supply-wiring harness unit.

BRIEF DESCRIPTION OF THE DRAWINGS

Other objects of the invention will become apparent as the description proceeds in connection with the accompanying drawings of which.

DESCRIPTION OF THE PREFERRED EMBODIMENTS

Figure 1:
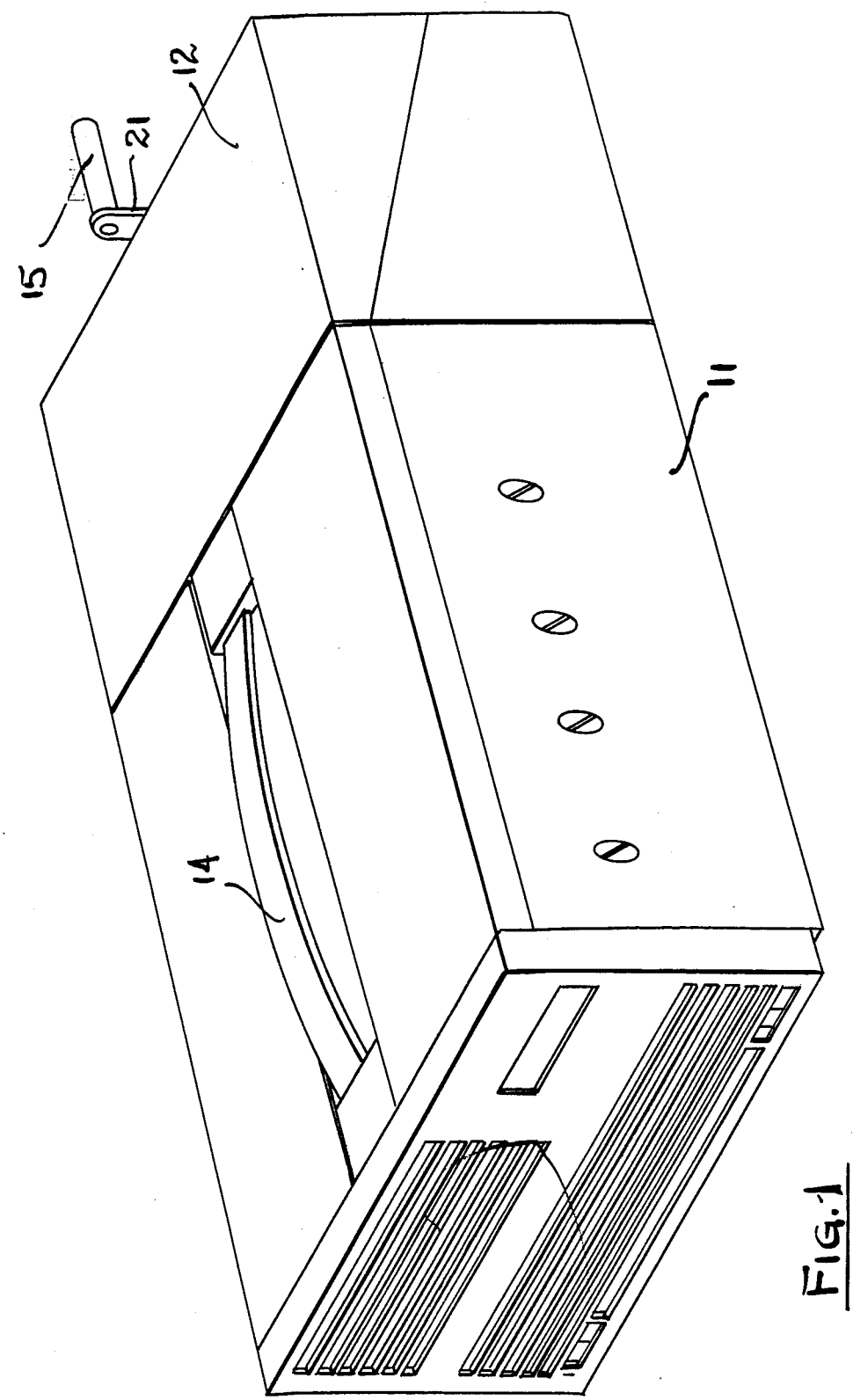
FIG. 1 is a perspective view of a preferred embodiment of the assembly of the invention.

Referring now to the Figures, a preferred embodiment of the invention is illustrated. As best can be seen in FIGS. 1–4, the assembly includes a disk pack unit 11 which is separably joined to a power supply-wiring harness unit 12. A carrying handle 14 is provided in the top cover of the disk pack unit 11 for use in carrying this unit. A crank 15 is provided for use in joining units 11 and 12 to each other and for separating the units from each other as to be described further on in the specification in greater detail.

Figure 2:
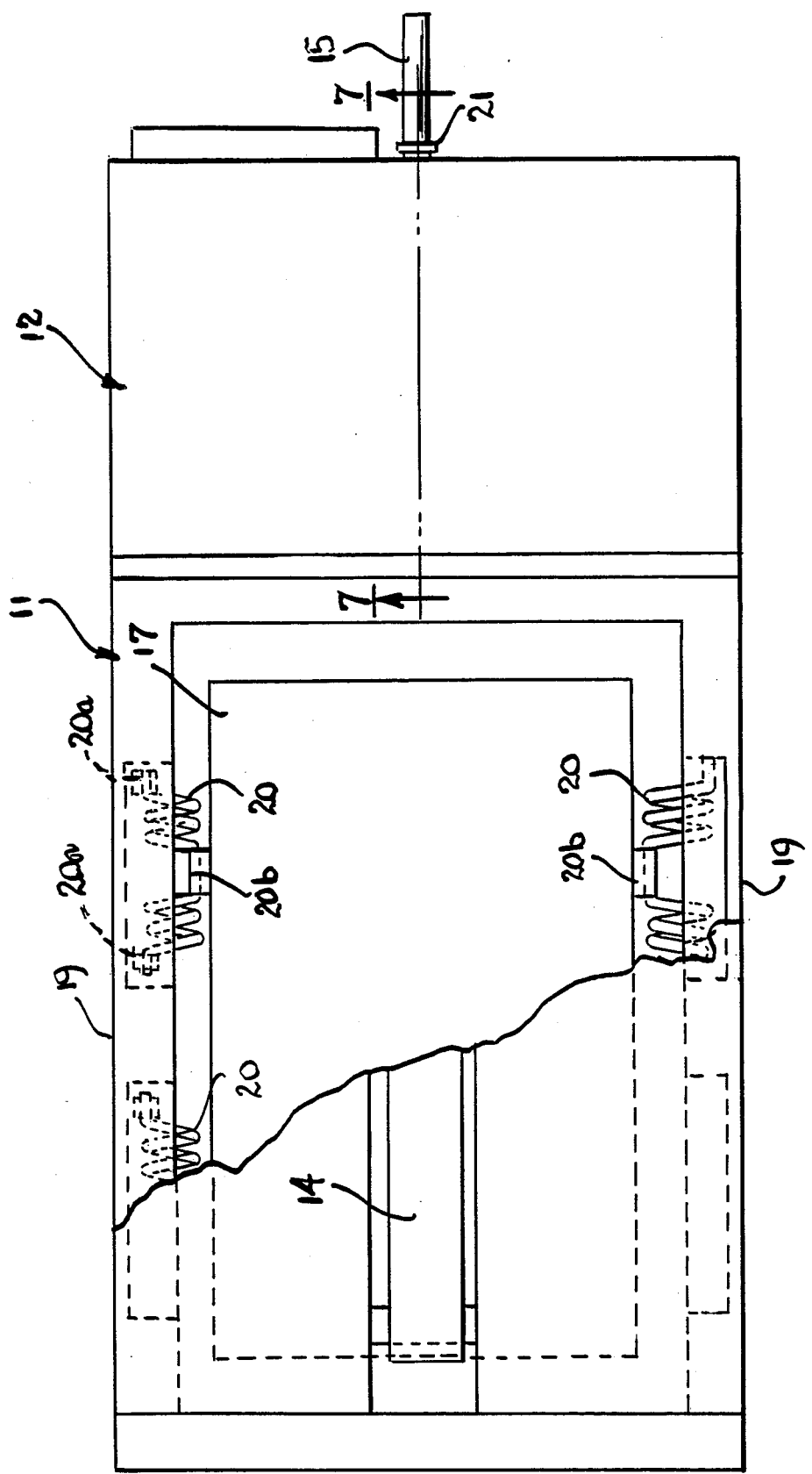
FIG. 2 is a top plan view with partial cutaway section of the preferred embodiment.
Figure 3:
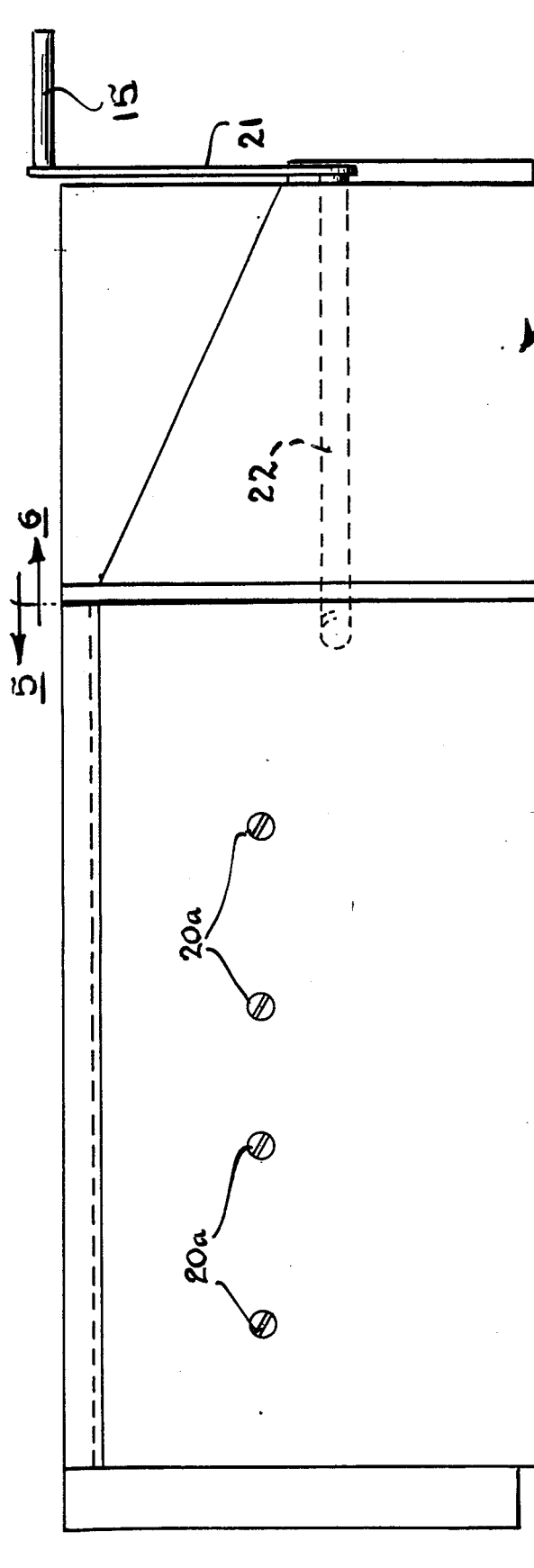
FIG. 3 is a side elevational view of the preferred embodiment.
Figure 7:
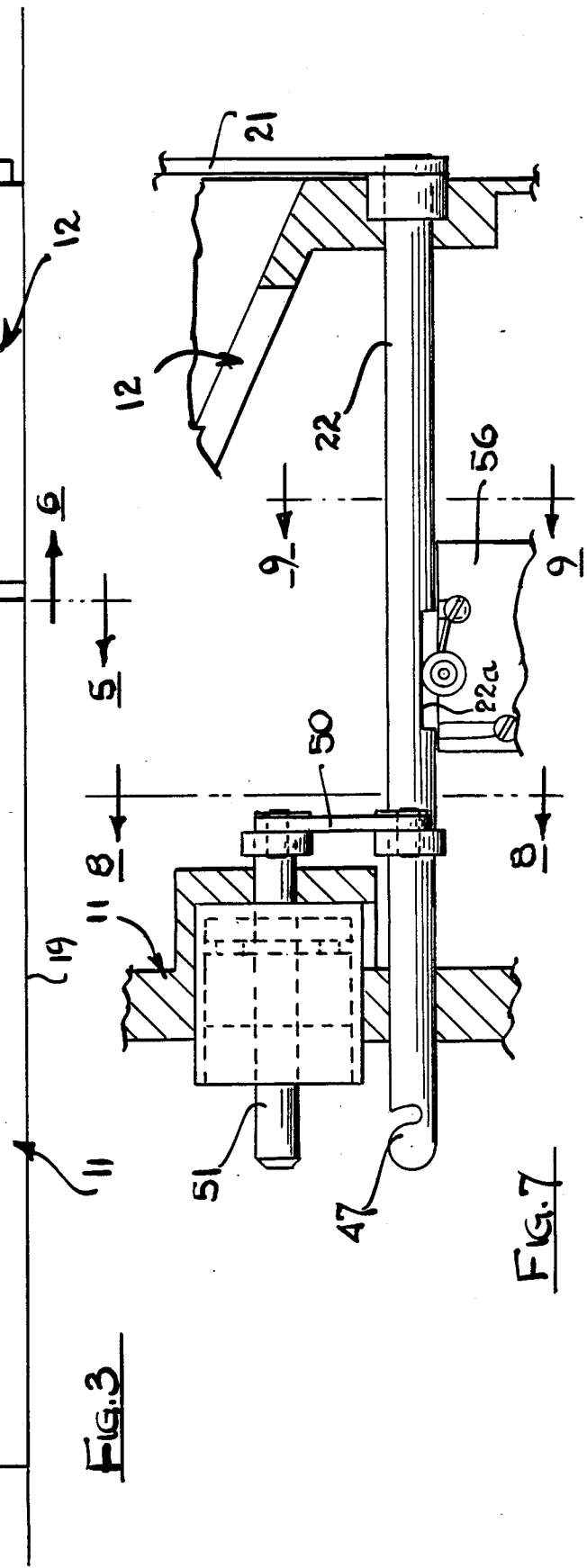
FIG. 7 is a cross sectional view taken along the plane indicated by 7—7 in FIG. 2.

As shown in FIG. 2, disk drive 17 is resiliently suspended within the housing 19 of unit 11 by means of coil springs 20 which are fabricated of spring steel wire and which are attached between the housing of disk drive 17 and the inner side walls of housing 19. The spring mounts provided by wire springs 20 are designed to provide optimum vibration and shock isolation for disk drive 17 while avoiding any natural resonant frequencies. Crank handle 15 is attached to a crank arm 21 which pivotally drives shaft 22 when the handle is actuated. Coil springs 20 are attached to the walls of housing 19 by means of mounting hardware 20a which includes screws which are fitted through the housing walls. Mounting brackets 20b are used to attach the springs to the housing of disk drive 17.

Figure 4:
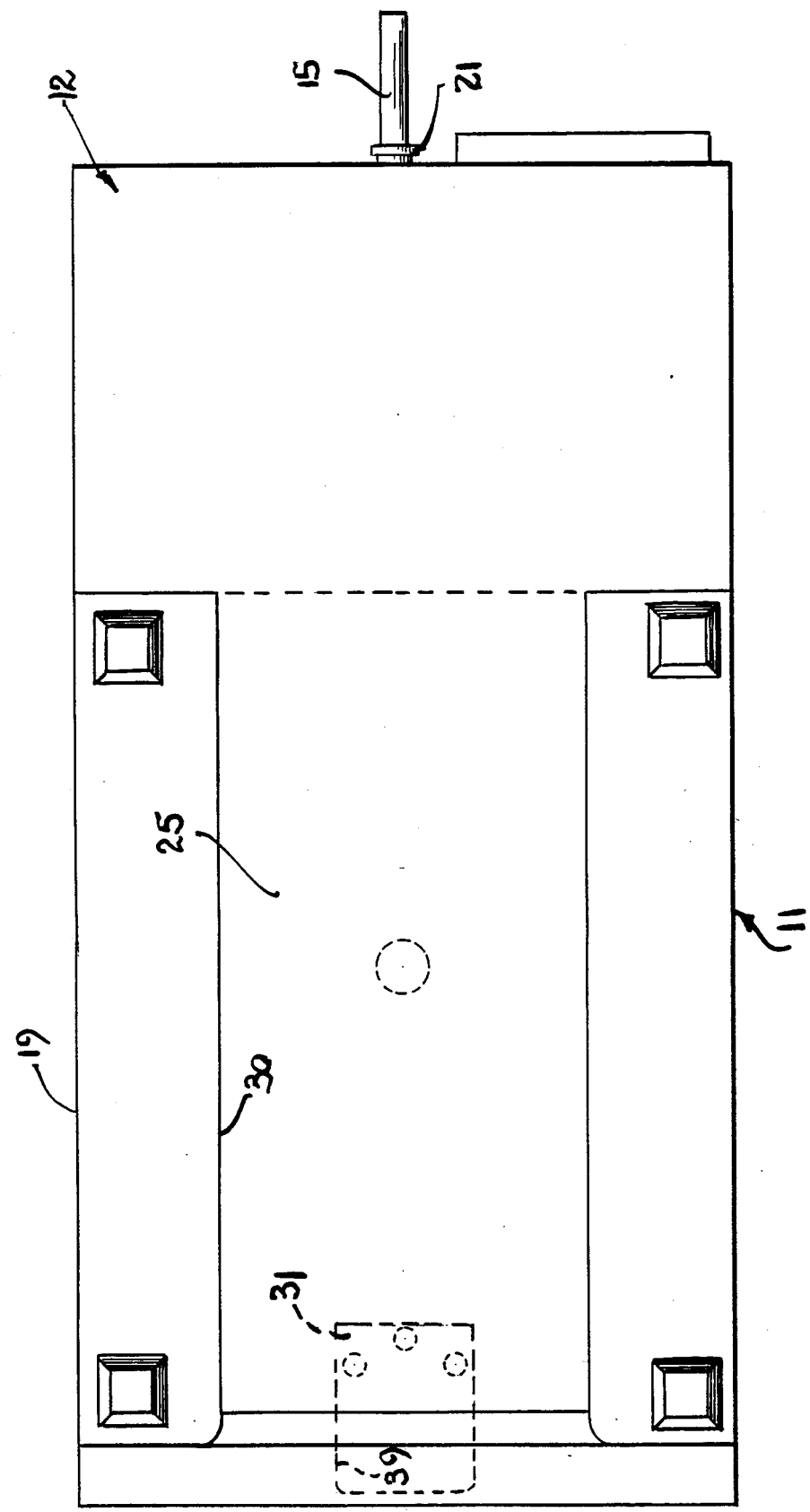
FIG. 4 is a bottom plan view of the preferred embodiment.
Figure 5:
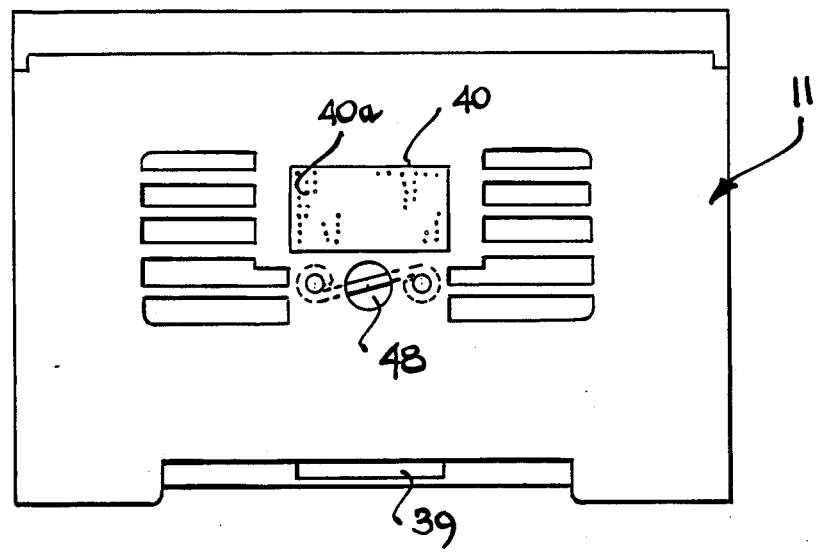
FIG. 5 is a rear elevational view of the disk drive unit of the preferred embodiment.

As best can be seen in FIG. 4, power supply-wiring harness unit 12 has an elongated plate member 25 which extends therefrom. This plate member is relatively thick (typically about ½ inch in thickness) and of a suitable material such as cast aluminum. Plate member 25 fits into mating channel 30 formed in the bottom of housing 19. Plate member 25 has a tongue 31 attached to the upper surface thereof and extending therefrom which fits into a mating slot 39 formed in the rear of the faceplate of housing 19.

Figure 6:
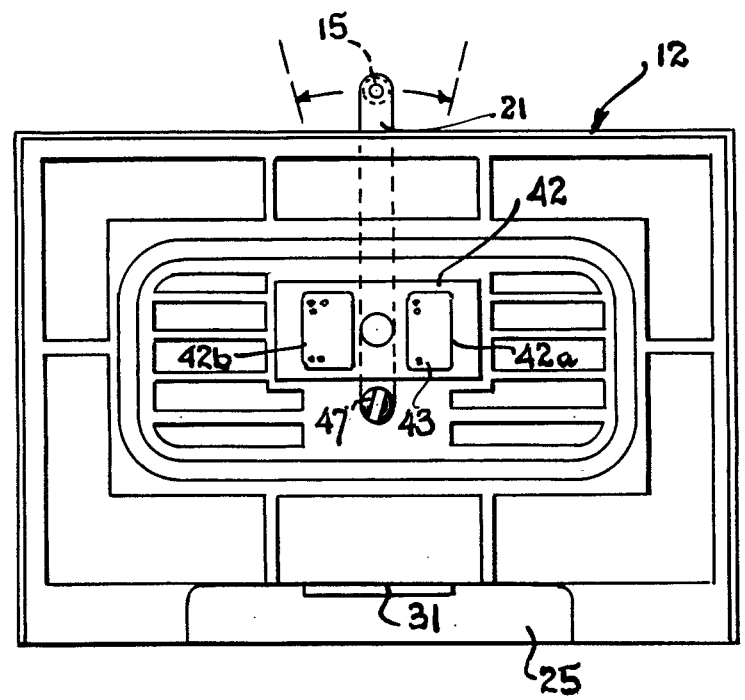
FIG. 6 is a front elevational view of a power supply-wiring harness unit of the preferred embodiment.

Referring now to FIGS. 5–9A, the interconnection between the two units will now be described. The disk drive unit 11 has an electrical connector 40 with a plurality of fixed pins 40a having a circular cross section, these pins being utilized for making electrical connections to the disk drive. As can be seen in FIG. 6, unit 12 has a connector 42 having a pair of laterally movable elements 42a and 42b with pins 43 which have a semicircular cross section. This type of connector assembly is known as a zero insertion force connector and is commercially available (DL3-60 type ZIF connector manufactured by ITT Cannon Corp.). Shaft 22 has a conventional spiral cam stud type Dzus fastener 47 on the end thereof which engages a female mating spring loaded receptacle element 48 on unit 11.

Figure 8:
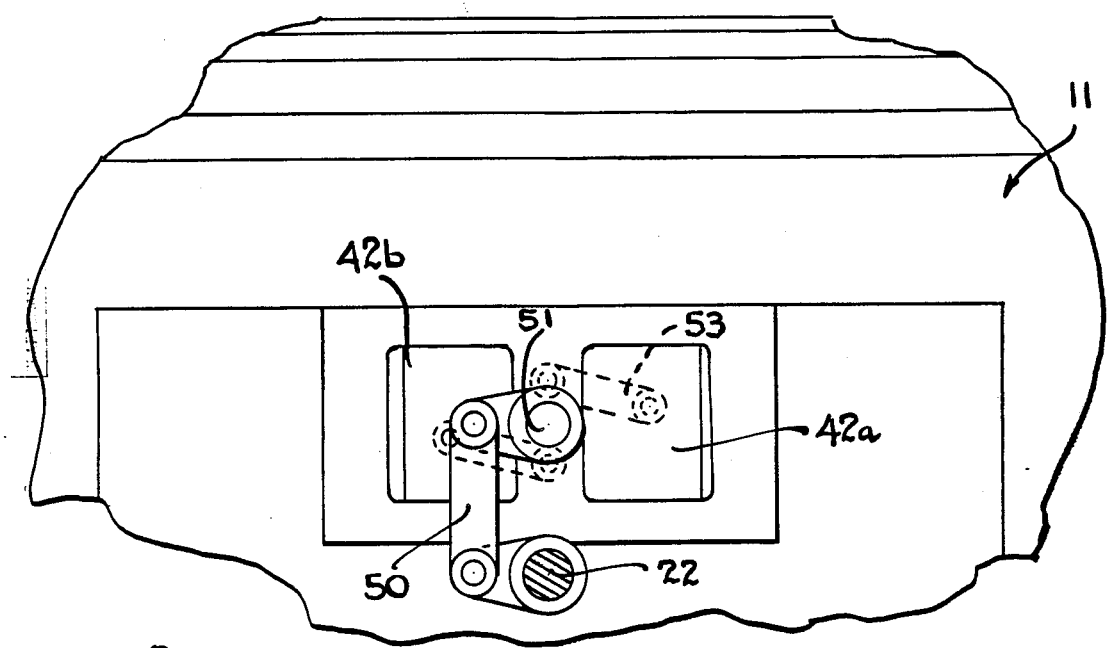
FIGS. 8 and 8A are cross sectional views taken along the plane indicated by 8—8 in FIG. 7.
Figure 8A:
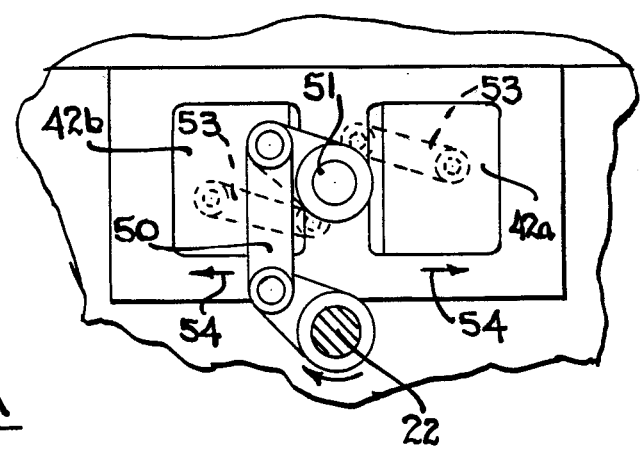
Figure 9:
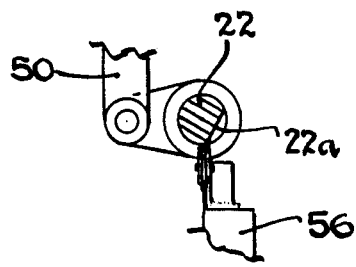
FIG. 9 is a cross sectional view taken along the plane indicated by 9—9 in FIG. 7.
Figure 9A:
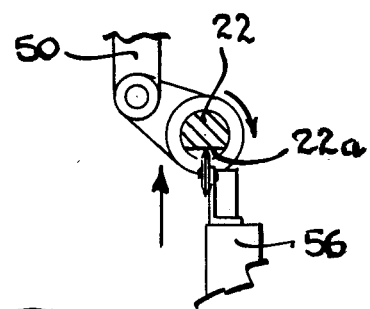
FIG. 9A is a similar view to that shown in FIG. 9 but with the drive shaft rotated to actuate a microswitch.

When crank 15 is initially actuated with the two units in position directly opposite each other, fastener element 47 engages fastener 48 to pull the units together in abutment against each other. In this initial latching position the pin contacts 43 of connector 42 are not in contact with contacts 40a of connector 40. This is the situation with shaft 22 in the position shown in FIG. 8. Further clockwise rotation of shaft 22 causes interconnecting linkage 50 to be driven as shown in FIG. 8A, this linkage in turn driving shaft 51 which in turn drives linkages 53 which are connected to connector elements 42a and 42b, these elements being driven outwardly in the directions indicated by arrows 54. When driven to this position, the grooved contact pins of connector elements 42a and 42b engage the contact pins of connector 40 to provide the desired electrical contact. At the same time when such contact is made, as shown in FIGS. 9 and 9A, camming surface 22a is rotated to effect the actuation of microswitch 56 which provides power to the power supply and thence to the disk drive through the contacts.

In separating the two units from each other to enable the removal of the disk pack unit 11, crank arm 15 is rotated counterclockwise to a "release" position whereupon the above described operation is effected in opposite order to enable the removal of unit 11.

While the invention has been described and illustrated in detail, it is to be clearly understood that this is intended by way of illustration and example only and is not to be taken by way of limitation, the spirit and scope of the invention being limited only by the terms of the following claims.

I claim:
1. A computer disk drive assembly comprising:
   a disk pack unit,
   a power supply-wiring harness unit for providing power and wiring interconnections for said disk pack unit,
   said disk pack unit including a housing having opposing walls, a disk drive, mounting means comprising wire coil springs attached to the walls of said housing and the disk drive for resiliently suspending said disk drive from the walls of said housing, said mounting means being adapted to provide vibration and shock isolation for said disk drive, connector means having contact pins for providing electrical connections to said disk pack unit, and an elongated channel formed in the bottom of said housing,
   said power supply-wiring harness unit including an elongated plate member extending from the bottom thereof, said plate member fitting into the channel in the bottom of the disk pack unit housing in mating engagement therewith, connector means having contact pins for providing electrical connection from said power supply-wiring harness unit to said disk pack unit, and fastener means for mechanically interconnecting said power supply-wiring harness and said disk pack units in latching engagement with each other.
   said fastener means operating on sequence first to mechanically join the units together with the connector means of said units joined together, then to bring the pins of the contact pins of said units into electrical contact with each other and finally to effect the connection of power from said power supply-wiring harness to unit to said disk pack unit.
2. A computer disk drive assembly comprising:
   a disk pack unit,
   a power supply-wiring harness unit for providing power and wiring interconnections for said disk pack unit,
   said disk pack unit including a housing having opposing walls, a disk drive, mounting means for resiliently suspending said disk drive from the walls of said housing, said mounting means being adapted to provide vibration and shock isolation for said disk drive, connector means having contact pins for providing electrical connections to said disk pack unit, and an elongated channel formed in the bottom of said housing,
   said power supply-wiring harness unit including an elongated plate member extending from the bottom thereof, said plate member fitting into the channel in the bottom of the disk pack unit housing in mating engagement therewith, connector means having contact pins for providing electrical connections from said power supply-wiring harness unit to said disk pack unit, and fastener means for mechanically interconnecting said power supply-wiring harness and said disk pack units in latching engagement with each other,
   said fastener means operating in sequence first to mechanically join the units together with the connector means of said units joined together, then to bring the pins of the connector pins of said units into electrical contact with each other and finally to effect the connection of power from said power supply-wiring harness unit to said disk pack unit;
   said fastener means comprising a crank pivotally mounted on said power supply-wiring harness unit, a shaft extending from the crank, said shaft having a first fastener on the end thereof, a second fastener mounted on said disk pack unit, said first and second fasteners engaging each other when the crank is pivotally driven, and interconnecting linkage means connected to said shaft and driven thereby to effect in sequence electrical contact between the connector pins and the connection of power from said power supply-wiring harness unit to said disk pack unit.

* * * * *